(12) United States Patent
Cho et al.

(10) Patent No.: US 9,870,025 B1
(45) Date of Patent: Jan. 16, 2018

(54) DISPLAY CASE

(71) Applicant: Emotive Digital LP, Livermore, CA (US)

(72) Inventors: Matthew Cho, Dublin, CA (US); David Hyung Yu, Dublin, CA (US)

(73) Assignee: Emotive Digital, LP, San Leandro, CA (US)

( * ) Notice: Subject to any disclaimer, the term of this patent is extended or adjusted under 35 U.S.C. 154(b) by 0 days.

(21) Appl. No.: 15/234,987

(22) Filed: Aug. 11, 2016

Related U.S. Application Data

(60) Provisional application No. 62/360,424, filed on Jul. 10, 2016.

(51) Int. Cl.

| | |
|---|---|
| F25D 23/02 | (2006.01) |
| G02F 1/13 | (2006.01) |
| G06F 1/16 | (2006.01) |
| G02F 1/1335 | (2006.01) |
| H05B 33/08 | (2006.01) |
| G06F 3/00 | (2006.01) |
| G06F 3/01 | (2006.01) |
| G06F 3/16 | (2006.01) |
| G09G 3/00 | (2006.01) |
| G06F 3/0488 | (2013.01) |
| G09G 3/36 | (2006.01) |
| G06F 1/32 | (2006.01) |

(52) U.S. Cl.
CPC ...... *G06F 1/1605* (2013.01); *G02F 1/133615* (2013.01); *G06F 1/3231* (2013.01); *G06F 3/005* (2013.01); *G06F 3/012* (2013.01); *G06F 3/017* (2013.01); *G06F 3/04883* (2013.01); *G06F 3/16* (2013.01); *G09G 3/002* (2013.01); *G09G 3/36* (2013.01); *H05B 33/0854* (2013.01); *G06F 2203/011* (2013.01)

(58) Field of Classification Search
USPC ........................................................ 345/173
See application file for complete search history.

(56) References Cited

U.S. PATENT DOCUMENTS

| | | | | |
|---|---|---|---|---|
| 2008/0117181 | A1* | 5/2008 | Park | G06F 3/0412 345/173 |
| 2008/0273138 | A1* | 11/2008 | Lee | B29C 45/14344 349/58 |
| 2010/0321887 | A1* | 12/2010 | Kwon | H05K 7/20972 361/695 |
| 2012/0060539 | A1* | 3/2012 | Hunt | A01N 1/0236 62/336 |
| 2012/0262473 | A1* | 10/2012 | Kim | H04N 1/40006 345/589 |
| 2013/0271696 | A1* | 10/2013 | Dunn | G09F 23/06 349/58 |
| 2014/0144083 | A1* | 5/2014 | Artwohl | A47F 3/0434 49/70 |
| 2014/0337151 | A1* | 11/2014 | Crutchfield | G06F 1/1601 705/17 |

(Continued)

FOREIGN PATENT DOCUMENTS

WO    WO2005/086526 A1    9/2005

*Primary Examiner* — Carolyn R Edwards
*Assistant Examiner* — Deeprose Subedi
(74) *Attorney, Agent, or Firm* — Paul D. Chancellor; Ocean Law

(57) ABSTRACT

A display case includes a transparent LCD panel for viewing display case contents therethrough.

9 Claims, 17 Drawing Sheets

(56) References Cited

U.S. PATENT DOCUMENTS

| | | | | |
|---|---|---|---|---|
| 2015/0234541 A1* | 8/2015 | Gong | .................... | G06F 3/0425 |
| | | | | 348/744 |
| 2015/0293636 A1* | 10/2015 | Park | ...................... | G06F 3/0418 |
| | | | | 345/174 |
| 2015/0332087 A1* | 11/2015 | Joshi | .................. | G06K 9/00288 |
| | | | | 382/203 |
| 2016/0253552 A1* | 9/2016 | Rihn | .................. | G06K 9/00302 |
| | | | | 382/224 |

* cited by examiner

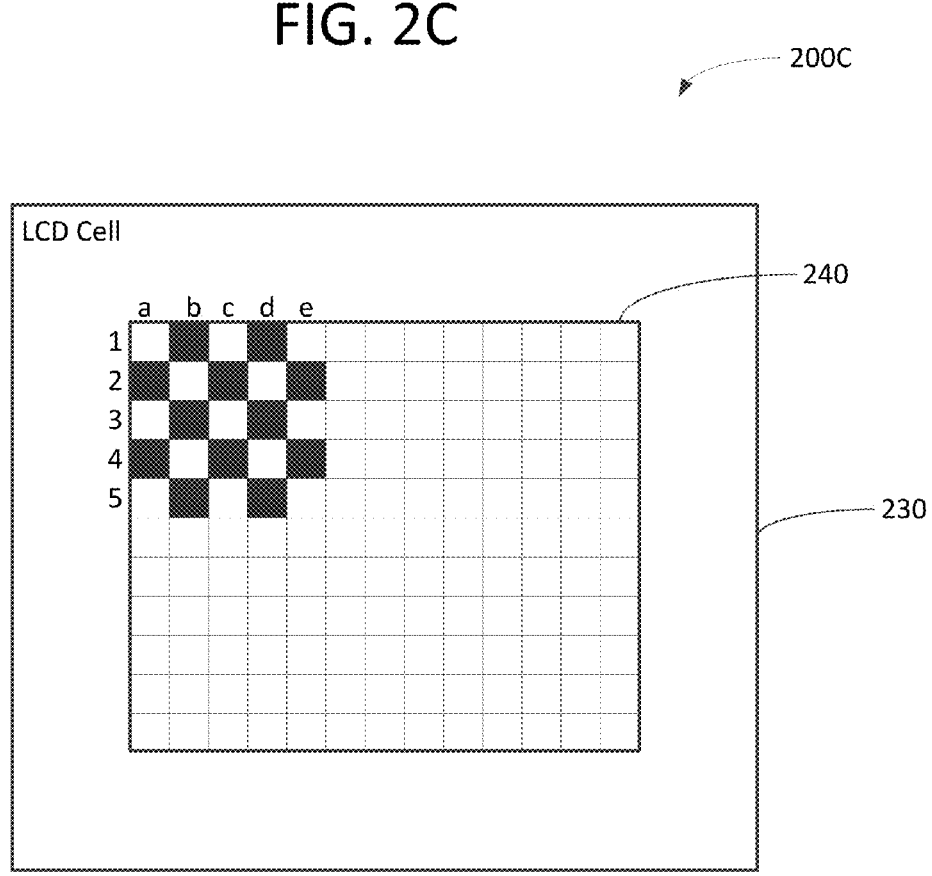

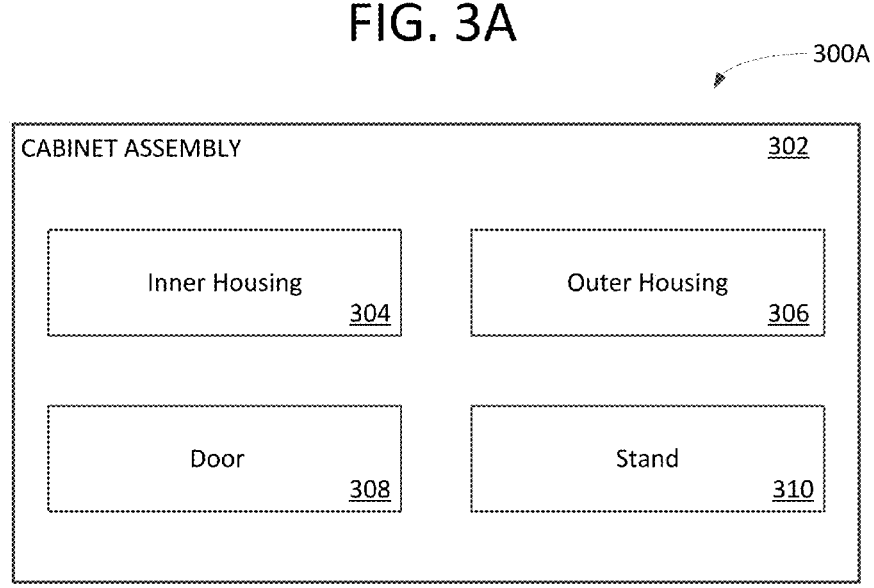
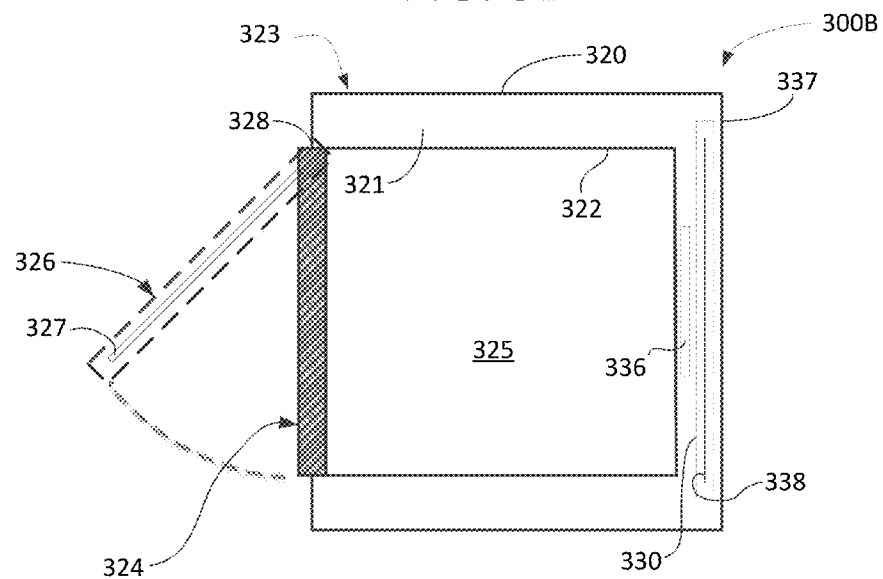

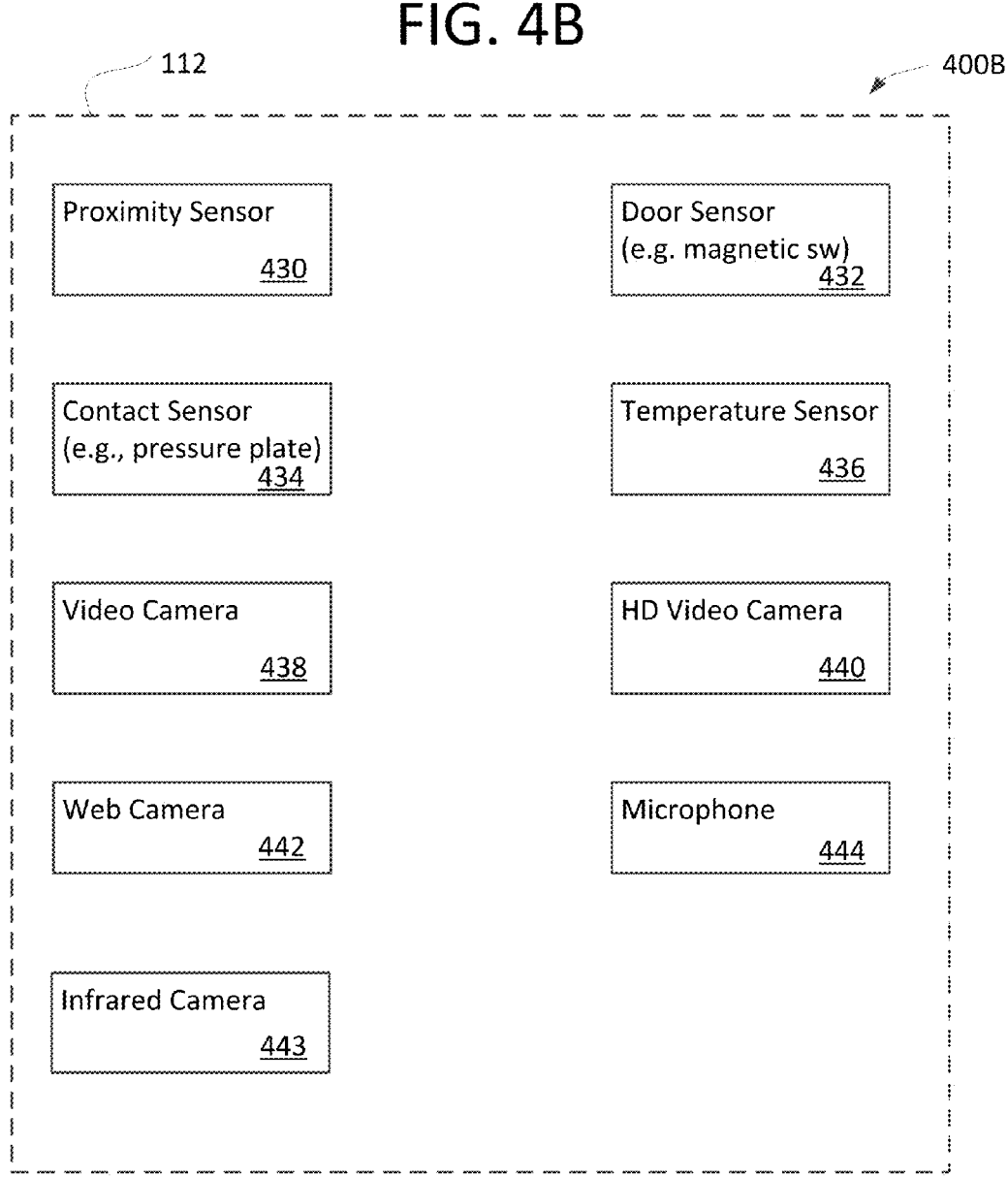

| Transparent LCD Panel Video 451 | Transparent LCD Panel Touch 452 |

| Keyboard/Keypad 453 | Video Camera 454 |

| Web Camera 455 | Audio Input Device (e.g., microphone) 456 |

| Video Projector 457 | Intel RealSense™ 458 |

| Environment Control 459 | Scanner 460 |

| Audio Output Device(s) 461 | POS Device 462 |

| Infrared Camera 463 |

| ACTIVITY | SENSOR | | | | | | | PROCESSOR | | MULTIMEDIA | | | |
|---|---|---|---|---|---|---|---|---|---|---|---|---|---|
| | Prox Sensor | Door Switch | Pressure Plate | Web Camera | Video Camera | Infrared Camera | Mike | Local Controller | Remote Controller | LCD Panel | Video Projector | Audio System | Enviro Control |
| Trigger | X | X | X | X | | | | | | | | | |
| Assessment | | | | X | X | X | X | X | | | | | |
| Construct Scene | | | | X | X | X | X | X | X | | | | |
| Deliver Scene | | | | | | | | | X | X | X | X | X |
| Respond To Feedback | | | | | | | | | | X | X | X | X |

FIG. 5D

| Device | Selection | Messaging | Payment | Manipulate Product | Dispense Product |
|---|---|---|---|---|---|
| 1. LCD Panel Touch | X | X | | X | X |
| 2. Keyboard/Keypad | X | X | | | |
| 3. Microphone | X (voice) | X | | | |
| 4. Video Camera/ Infrared Camera | X (gestures) | | | | |
| 5. Environment Control | | | | X | X |
| 6. Point Of Sale | | | X | | |
| 7. Local MMI | X | X | | | |
| 8. Remote MMI | X | X | X | X | X |

FIG. 5E

| Device | Facial Recognition | Demeanor Recognition | Proximity Sensing | Position Sensing |
|---|---|---|---|---|
| 1. Video Camera/ Infrared Camera | X | X | X | X |
| 2. Proximity Sensor | | | X | X |
| 3. Pressure Plate Sensor | | | X | X |
| 4. Door Switch | | | | X |

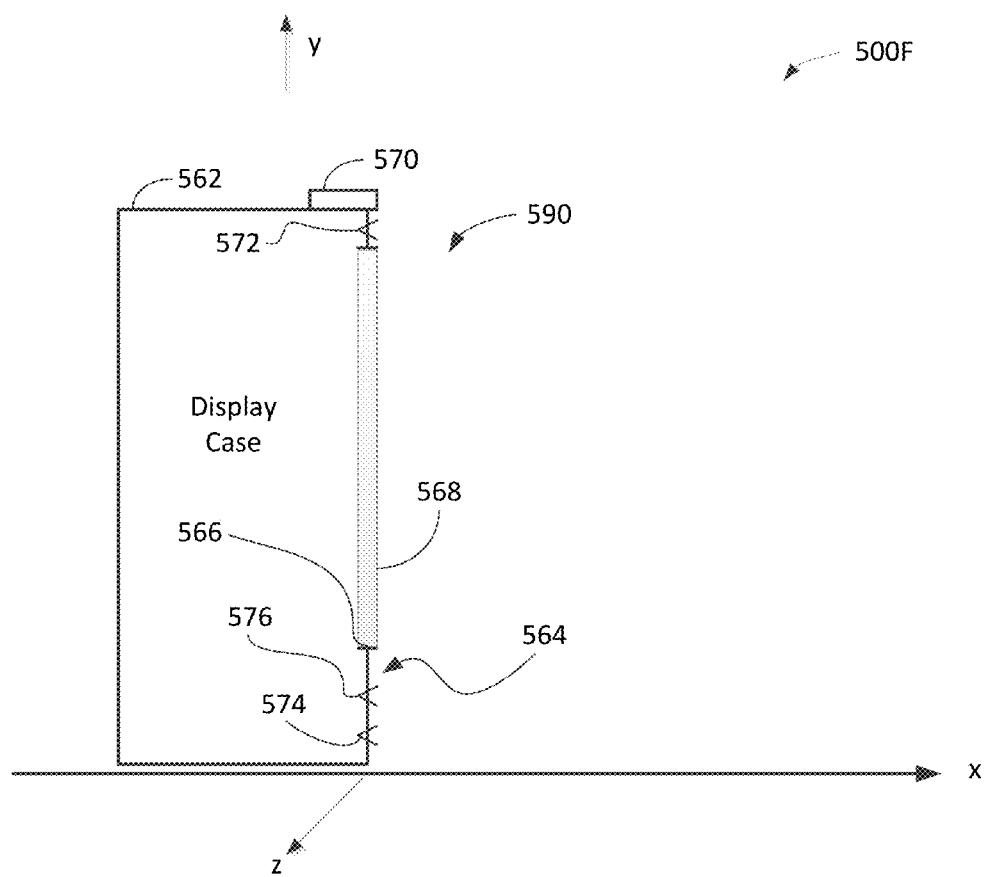

DISPLAY CASE

PRIORITY CLAIM AND INCORPORATION BY REFERENCE

This application claims the benefit of U.S. Prov. Pat. App. No. 62/360,424 filed Jul. 10, 2016. This application incorporates by reference, in their entireties and for all purposes, U.S. Prov. Pat. App. No. 62/360,424 and international patent application number WO2005/086526 A1.

BACKGROUND OF THE INVENTION

Field of the Invention

The present invention relates to a new and useful machine. In particular, the display case includes a transparent video screen for viewing display case contents.

Discussion of the Related Art

Display cases are well known in various environments including the shops and stores of merchants and along the refrigerated/freezer product aisles of grocery stores and markets. Typical of such display cases are viewing ports or windows that enable observation of items within the case.

SUMMARY OF THE INVENTION

Embodiments of the present invention provide a display case with a transparent video screen through which items within the case may be viewed.

In an embodiment, a display case system is for viewing a product through a transparent liquid crystal display (LCD) screen, the display case comprising: a housing arranged around a product display space; the screen and a housing opening arranged to provide a view through the screen into the product display space; a plurality of light emitting diode (LED) arrays within the housing for backlighting the screen; a power supply for selectively distributing electric power to one or more of the arrays; a local controller electrically coupled with the power supply and a sensor; and, the sensor for triggering operation of the screen when a patron approaching the display case is recognized by the sensor.

In an embodiment, the display case further comprising: a multimedia patron immersion function; tasks implementing the function include patron assessment, scene creation, scene delivery, and a response to patron feedback; patron assessment including recognition of visual characteristics of patron via a video camera; scene creation that results in video and audio content that is personalized based on patron assessment; delivery of the personalized scene directed to a space occupied by the patron; and, recognition of patron feedback and delivery of a response directed to a space occupied by the patron.

In an embodiment, the display case wherein: patron assessment includes an assessment of patron gender, age, and ethnicity assessments; scene creation utilizes content derived from video camera images of the patron; scene delivery includes video presented in a first plane via the LCD screen and video presented in a second plane that intersects the first plane; scene delivery includes audio presented via a sound field focused on the patron; patron feedback is via patron gestures received by the video camera and interpreted by the local controller; and, delivery of a response to the feedback includes actual or virtual manipulation of a product within the display case.

In an embodiment, the display case wherein patron assessment further includes an assessment of patron reaction, mood, and head tracking or wherein the video presented in the second plane is video projected on a surface adjacent to the patron.

In an embodiment, a donation receptacle for receiving donations and for viewing received donations through a transparent liquid crystal display (LCD) screen, the receptacle comprising: a housing arranged around a donation display space; the screen and a housing opening arranged to provide a view through the screen into the donation display space; a plurality of light emitting diode (LED) arrays within the housing for backlighting the screen; a power supply for selectively distributing electric power to one or more of the arrays; a local control including a media player electrically coupled with the power supply and a proximity sensor; and, the proximity sensor for triggering operation of the screen.

In an embodiment, the donation receptacle wherein the LCD screen is touch sensitive for one or more of charity selection, payment, and collection of donor information used to report donor activity via a social media website.

In an embodiment, the donation receptacle wherein the screen and speakers deliver a multimedia message to an approaching patron that triggers the proximity sensor.

In an embodiment, the donation receptacle wherein the screen and speakers deliver a multimedia message to a patron following insertion of a donation in the receptacle.

BRIEF DESCRIPTION OF THE DRAWINGS

The present invention is described with reference to the accompanying figures. These figures, incorporated herein and forming part of the specification, illustrate some embodiments of the invention and, together with the description, further serve to explain its principles enabling a person skilled in the relevant art to make and use the invention.

FIGS. 2A-C show features of a transparent LCD panel of the display case of FIG. 1.

FIGS. 3A-F show mechanical features of the display case of FIG. 1.

FIGS. 4A-D show electrical and electronic features of the display case of FIG. 1.

FIGS. 5A-G show operational features of the display case of FIG. 1.

DETAILED DESCRIPTION OF PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the terms "coupled" and "attached" include direct and indirect connections. Moreover, where first and second devices are coupled or attached, intervening devices including active devices may be located therebetween.

Figure 1:
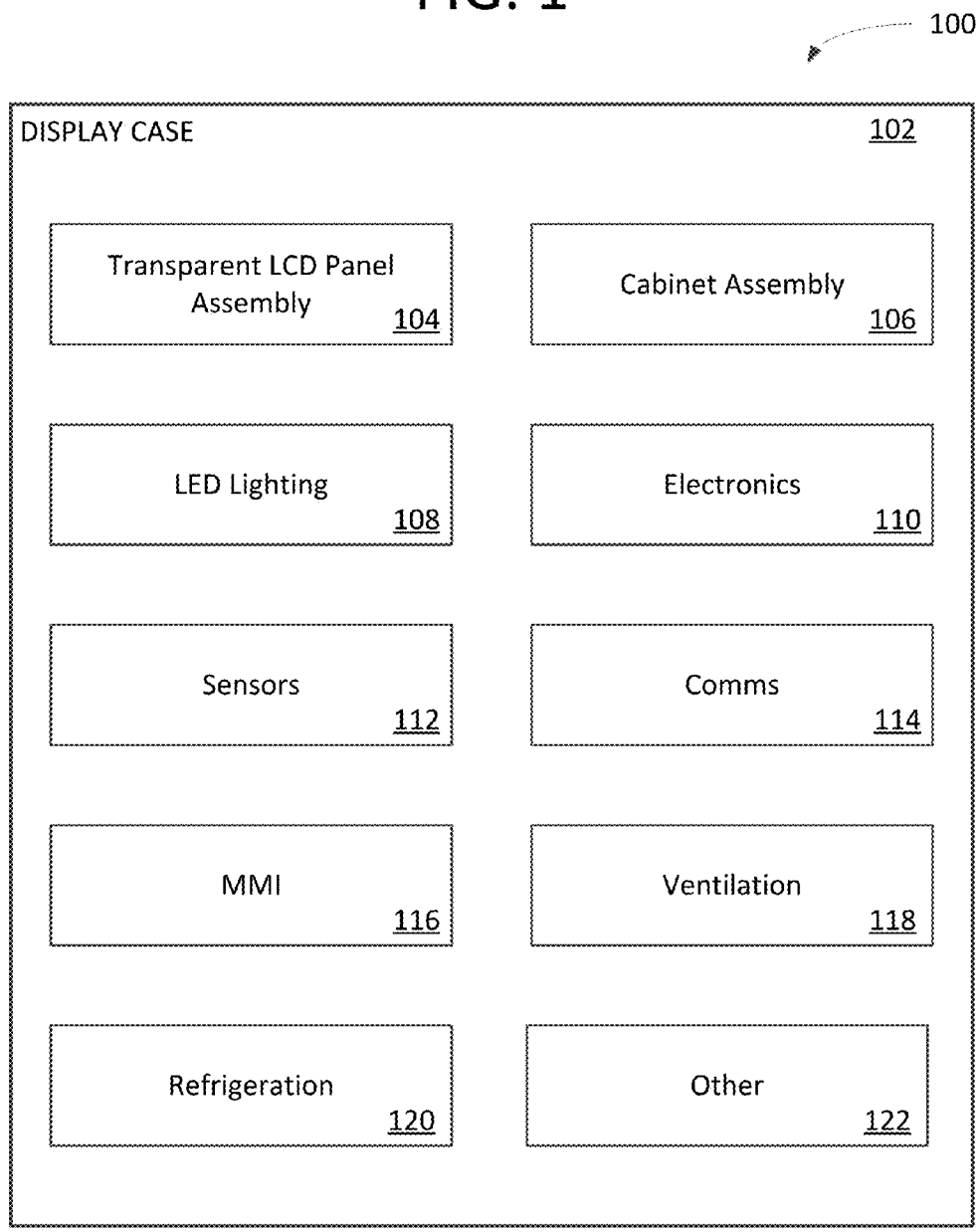
FIG. 1 shows a block diagram of a display case of the present invention.

FIG. 1 shows a display case system 100. A typical display case system 102 includes a transparent LCD panel assembly 104, LED lighting 108, one or more sensors 112, a cabinet assembly 106, and electronics 110. Some embodiments of the display case system include one or more of a man-machine interface ("MMI") 116, a refrigeration/freezer unit 120, communications devices ("Comms") 114, ventilation devices 118, and other devices 122.

Figure 2A:
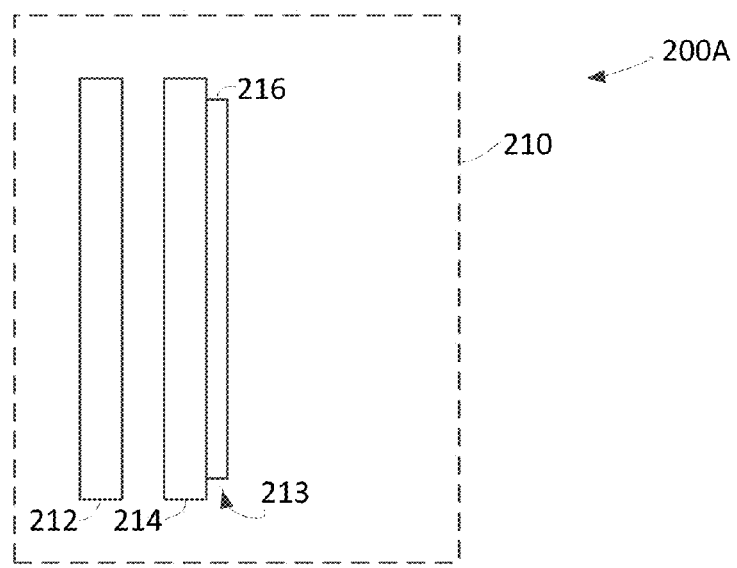
Figure 2B:
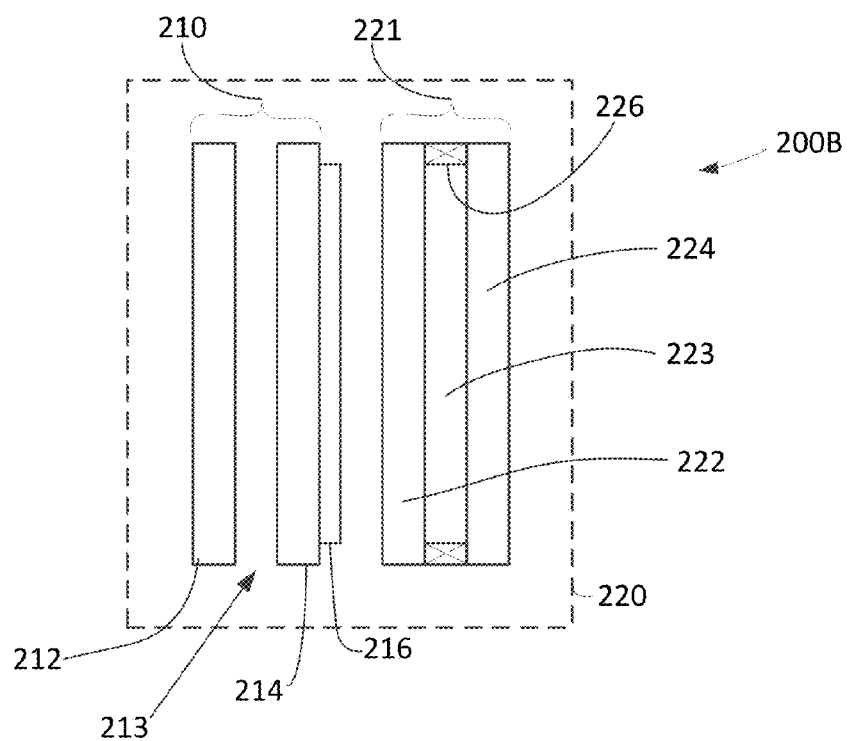

FIGS. 2A-B show transparent LCD panel assemblies 200A-B.

In FIG. 2A, a first transparent LCD panel assembly 210 is included. Here, the panel assembly may be referred to as an active or protected active assembly.

This first transparent LCD panel assembly 210 includes a front glass such as a tempered glass 212 and behind the front glass an LCD cell assembly 213 including an LCD cell carrier glass 214 and an LCD cell 216. In various embodiments the transparent LCD cell includes LCD crystals interposed between first and second glass plates. And, in various embodiments, the LCD cell includes a vertical filter, a horizontal filter, and a color filter. For example, a vertical filter may be adjacent to the first glass plate and horizontal and color filters may be adjacent to the second glass plate.

In FIG. 2B, a second LCD panel assembly 220 includes a forward assembly 210 and a rearward assembly 221. The forward assembly 210 may be referred to as an active or protected active assembly.

This second transparent LCD panel assembly includes a front glass such as a tempered glass 212 and behind the front glass an LCD cell assembly 213 including an LCD cell carrier glass 214 and an LCD cell 216. In various embodiments the transparent LCD cell includes LCD crystals interposed between first and second glass plates. And, in various embodiments, the LCD cell includes a vertical filter, a horizontal filter, and a color filter. For example, a vertical filter may be adjacent to the first glass plate and horizontal and color filters may be adjacent to the second glass plate.

The rearward assembly 221 may be referred to as a pair glass or thermal insulating assembly. The rearward assembly 221 includes a forward glass 222 and a rearward glass 224 spaced apart by spacers 226 such that a gap 223 is formed therebetween. The gap space may be evacuated and/or filled with a gas such as a low thermal conductivity gas, for example filled with nitrogen.

In some embodiments, the rearward assembly 221 includes means for prevention and/or elimination of glass fogging. For example, i) any of the pair glass 222, 224 or ii) a frame in which a pair glass is mounted may be heated as by an electrically resistive heater trace (e.g., conductive paint) on the glass or using heater wire such as nichrome wire embedded in the door frame.

FIG. 2C shows a schematic representation of an LCD cell 200C. Here, an LCD cell 230 includes a pixel array 240. As seen in the figure, pixels may be regularly arranged as in a grid like arrangement with rows 1, 2, 3, 4, 5 . . . and columns a, b, c, d, e . . . .

In use, all of the pixels of an LCD panel are typically operated to produce respective brightnesses and colors, for example through the use of filtered subpixels and related operating voltages, that reproduce an image sent to the LCD cell 230. In the present invention, some embodiments use an atypical pixel operating scheme wherein some pixels such as pixels in a regular pattern of pixels are operated for continuous transparency while the remaining pixels are operated to reproduce the desired image.

For example, the pattern may be an "every other" type pattern such that pixels a1, a3, a5 . . . ; b2, b4 . . . ; c1, c3, c5 . . . ; d2, d4 . . . ; e1, e3, e5 . . . ; are operated for continuous transparency. Operating sets of pixels in patterns or regular patterns for continuous transparency may enhance the viewability of images presented on a transparent LCD panel and may enhance the transparency of the LCD panel and thus the view of product(s) within.

The schematics FIGS. 3A-F show cabinet assemblies 300A-F.

In FIG. 3A a cabinet assembly 302 may include one or more components 300A. The cabinet assembly includes a housing and a means of accessing a housing interior. For example, a housing assembly may include a housing such as an outer housing 306 and a door 308. Embodiments may also include an inner housing 304 and/or a stand 310. Where inner and outer housings are included, a space between the housings may be created and used for channeling ventilation air, for wireways, for enabling relative motion of the housings, and/or for thermal or mechanical isolation between the housings.

In FIG. 3B, a schematic top view or cross-sectional top view of a display case is shown 300B. The display case includes a housing 323 and a door 324, 326 that is hinged 328 to the housing. As shown, the door may be pivoted from a closed position 324 to an open or partially open position 326. In some embodiments, the housing 323 includes an outer housing such as an outer shell 320, and inner housing such as an inner shell 322 and a space 321 therebetween. Where the inner housing defines a refrigerated/freezer space, the space between the housings may be used for, inter alia, a thermal insulation space.

In various embodiments, the door 324 includes a transparent LCD panel assembly 327 which provides a viewing port into a display space 325 enclosed at least in part by the inner housing 322. Where the display space is refrigerated, the LCD panel assembly may be similar to that of FIG. 2B. Where the display space is not refrigerated, the LCD panel assembly may be similar to that of FIG. 2A. As can be appreciated from the above, operation of the transparent LCD panel may mask display case contents to a variable extent such that contents are totally recognizable through the LCD panel, only partially recognizable through the LCD panel, or not recognizable through the LCD panel.

In some embodiments, the display case has a transparent wall such as a transparent back wall 337 that provides for viewing therethrough. Here, a pocket 330 between the wall 337 and inner housing 322 may be used to receive via a display case top or side slot a insertable graphic 338 for display via the transparent back wall. In an embodiment, prior to insertion of the graphic the transparent back wall and the transparent LCD panel face each other such that a view or an unobstructed view is provided through the display case. Graphic display lighting 336 may be provided by any suitable means, for example by one or by an array of LED's located between the graphic and the inner housing.

Figure 3C:
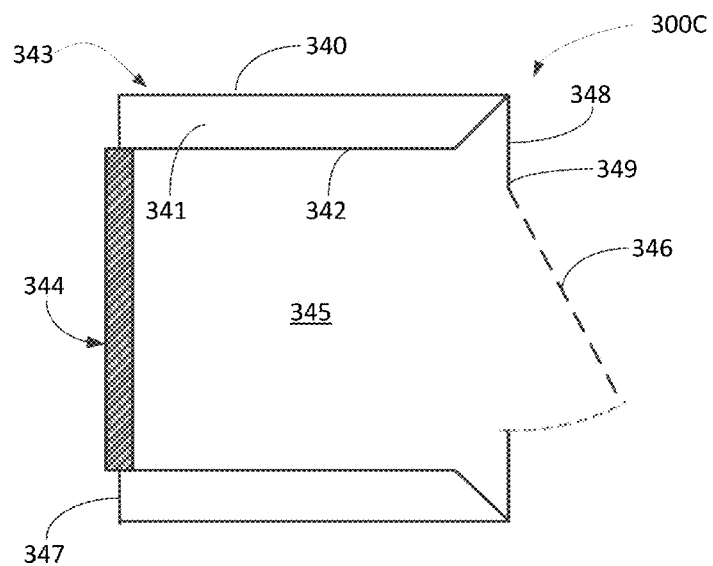

In FIG. 3C, a schematic top view or cross-sectional top view of another display case is shown 300C. The display case includes a housing 343, a transparent LCD panel 344 inserted in a front face or wall 347 of the case, and a door 346 inserted in a back face or wall 348 of the case. The door is hinged 349 or otherwise mounted to the case to allow access to the display interior 345.

In some embodiments, the housing 343 includes an outer housing such as an outer shell 340, and inner housing such as an inner shell 342 and a space 341 therebetween. Where the inner housing defines a refrigerated/freezer space, the space between the housings may be used for, inter alia, a thermal insulation sp ace.

The transparent LCD panel assembly 344 provides a viewing port into the display space 345 enclosed at least in part by the inner housing 342. Where the display space is refrigerated, the LCD panel assembly may be similar to that of FIG. 2B. Where the display space is not refrigerated, the LCD panel assembly may be similar to that of FIG. 2A. As can be appreciated from the above, operation of the transparent LCD panel may mask display case contents to a variable extent such that contents are totally recognizable through the LCD panel, only partially recognizable through the LCD panel, or not recognizable through the LCD panel.

Figure 3D:
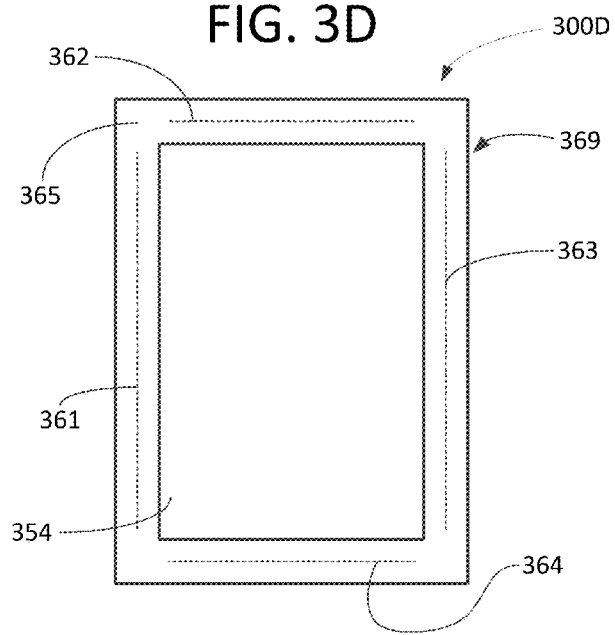

In FIG. 3D, a transparent LCD panel and a frame of the LCD panel are shown 300D. The transparent LCD panel frame 365 holds the LCD panel 354 that provides a view into an interior of a display case (not shown). LED lights for illuminating the LCD panel are mounted on the frame and/or on the LCD panel near the edges of the LCD panel. In some embodiments the frame is a door frame. In some embodiments the LCD panel and frame 369 is a part of or substantially all of a display case front. The LED lights may be arranged as arrays, for example as linear arrays, along LCD panel edges. In an embodiment, LED lights are to either side 361, 363 of the LCD panel. LED lights may also be located above 362 and/or below 364 the LCD panel.

The LED lighting 361-364 may be selectively operated individually or as a group. For example, the LED lighting may be turned off when the transparent LCD screen is not in use. For example, the LED lighting may be turned off when a door in which a lighted LCD screen is located is opened.

Figure 3E:
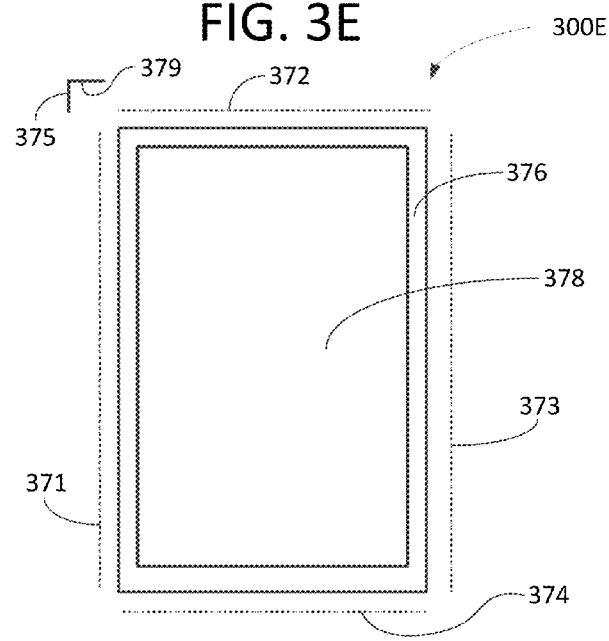

In FIG. 3E, a transparent LCD panel and an LCD panel surround are shown 300E. The transparent LCD panel 378 is for providing a view into an interior of a display case (not shown). LED lights such as arrays of LED lights are for illuminating the LCD panel. The LED lights may be arranged as arrays, for example as linear arrays, along LCD panel edges. In an embodiment, LED lights are to either side 371, 373 of the LCD panel. These LED lights may be mounted to either of a display housing 375 or the LCD panel surround 376. LED lights may also be located above 372 and/or below 374 the LCD panel. These LED lights may be mounted to either of the display housing or to the LCD panel surround. In some embodiments, multiple rows of led lighting are provided, for example multiple rows of LED lighting located above 372 the LCD panel as in a ceiling 379 of the display space. Illumination provided by the LED lighting within the display case may be in the range of 1000 to 10000 lumens.

The LED lighting 371-374 may be selectively operated individually or as a group. For example, the LED lighting may be turned off when the transparent LCD screen is not in use. For example, the LED lighting may be turned off when a door in which a lighted LCD screen is located is opened.

Figure 3F:
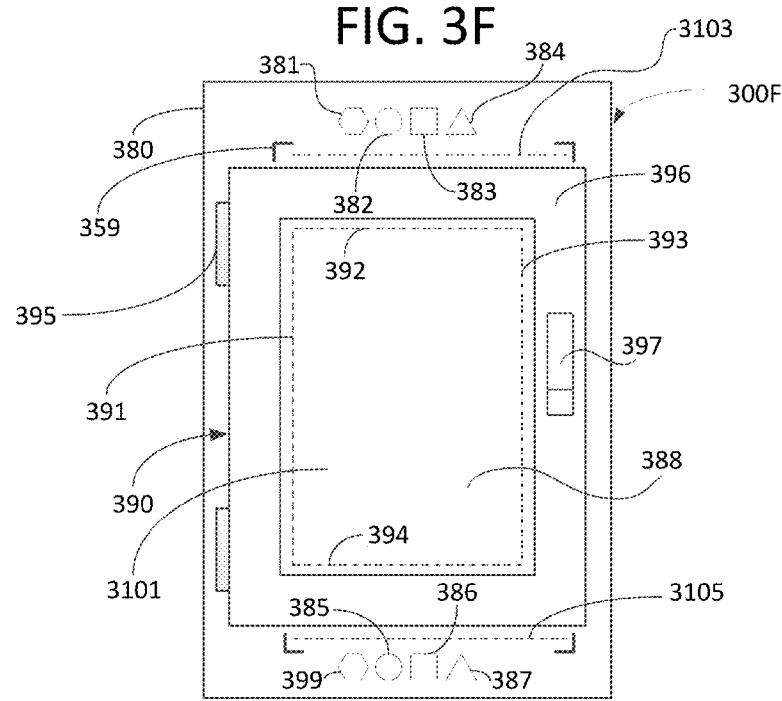

In FIG. 3F, another display case is shown 300F. As seen, a hinged 395 door assembly 390 with a door handle and/or latch 397 provides access to a display space 3101 within an outer housing 380. The latch may be electrically operated, as by a solenoid or motor, for either of local or remote latching and de-latching. A door state or position sensor such as a magnetic or reed switch may be located with the door latch or with another part of the door and/or housing assembly.

The door assembly 390 includes a transparent LCD panel 388 within a frame 396 such that the display space 3101 is visible through the LCD panel. Lighting for the LCD panel is provided by lighting mounted to the door assembly 390 and/or a housing such as the outer housing 380 and/or an inner housing 359. Door assembly mounted lighting may be provided along opposing vertical edges 391, 393 of the LCD panel and along opposing horizontal edges 392, 394 of the LCD panel. Housing mounted lighting may be provided in addition to and or in lieu of door assembly mounted lighting. For example, housing mounted lighting above the LCD panel 3103 may be provided in lieu of upper door assembly mounted lighting 392. For example, housing mounted lighting 3105 below the LCD panel 388 may be provided in lieu of lower door assembly mounted lighting 394.

Various sensors may be used in connection with operating and monitoring of the display case 300F. In particular, sensors may be mounted to or within either of the outer housing 380 and the inner housing 395. An audio transducer such as a speaker or an ultrasonic device may be mounted above 381 or below 399 the door assembly 390. A proximity sensor may be mounted above 382 or below 385 the door assembly 390. A video camera and/or infrared camera or sensor may be mounted above 383 or below 386 the door assembly. A video projector may be mounted above 384 or below 387 the door assembly. Notably, any of the proximity sensor, video camera, infrared camera, and infrared sensor may be adapted for use as a proximity sensor.

The schematics of FIGS. 4A-D show display case electrical devices and device interconnections 400A-D.

Figure 4A:
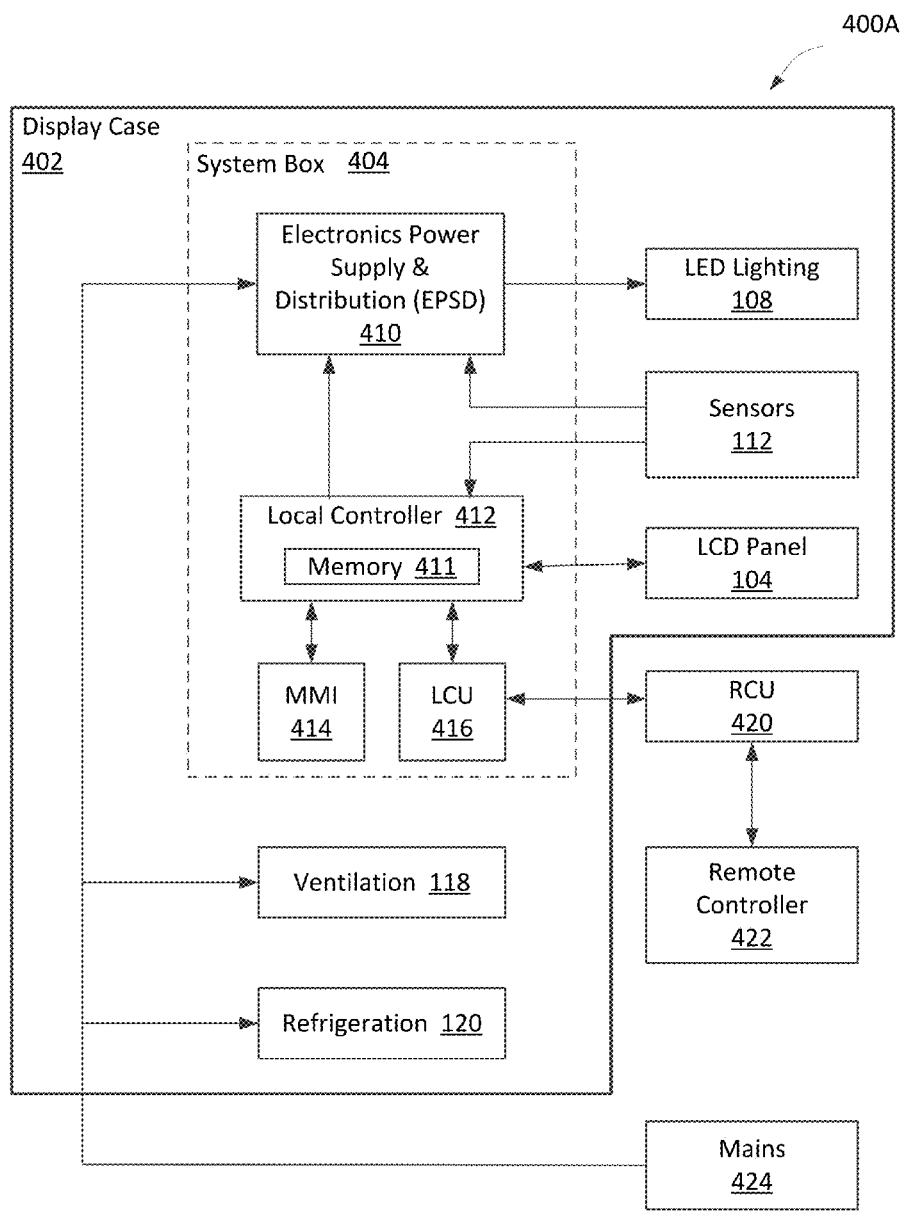

In FIG. 4A, a display case 402 includes a system box 404 with electrical interconnections to display case devices. In some embodiments, there are electrical interconnections between the system box and devices such as remote communications devices that are external to the display case (as shown).

The system box 404 includes an electronics power supply and distribution unit (EPSD) 410 and may include any of a local controller 412, a local communications unit (LCU) 416, and a local man-machine interface 414. In some embodiments the local controller is or includes a media player.

The EPSD 410 receives power from a mains connection 424 and provides power to the LED lighting 108. In various embodiments, the EPSD receives control signals from the local controller while both the EPSD and the local controller 412 receive signals from one or more sensors 112 such as the proximity sensors mentioned above.

Embodiments include a transparent LCD panel 104. Local controller 412 memory 411 such as semiconductor or magnetic memory may provide stored video content viewable on the transparent LCD panel 104. The LCD panel may be a touch sensitive device such that communications between the LCD panel and the local controller are bi-directional.

Communications with the local controller 412 may be via the local man-machine interface 414 including any of a monitor, keyboard, keypad, mouse, and the like. For example, the local controller 412 may be a microprocessor based computing device such as a personal computer or computer server running, for example, a Windows®, Android®, Java® or Unix® based operating system, the mentioned peripherals being coupled to the computing device.

Communications with the local controller 412 may be via the local communications unit (LCU) 416. In various embodiments the LCU provides two way communications with a remote communications unit (RCU) 420. The LCU/RCU pair may utilize any communications media and protocol suited to the application including wired media, wireless media, any 802.x IEEE wireless communications standard, and custom protocols. In an embodiment, the LCU includes a wireless 802.x WiFi device and the RCU provides a gateway such as an Internet connected gateway with 802.x WiFi connections for communicating with the LCU.

Remote control of the display case 402 may be via a remote controller 422 that is in communication with the RCU 420. The remote controller may be a hardwired or wireless device and data exchanged between the remote controller and the RCU may be transported over the Internet or not.

As mentioned in connection with FIG. 1 above, a display case may include a ventilation system 118 and/or a refrigeration/freezer system 120. Ventilation system devices such as fans may be powered by the mains connection 424 (as shown) or by the EPSD as when variable speed fans utilizing temperature feedback control are used. Refrigeration/freezer devices such as fans and compressors may be powered by mains connection 424 (as shown) or by the EPSD as when variable speed fans or compressor utilizing temperature feedback control are used.

In FIG. 4B, sensors that may be used in connection with display case operations are shown 400B. As seen, special purpose proximity sensors include proximity 430, magnetic switch 432, and contact sensors 434. Visual sensors include video 438, HD video 440, web 442 cameras, and infrared cameras 443. Audio sensors include microphones 440. Other sensors may be included such as a temperature sensor 436 for monitoring temperature(s) within the display case.

Non-contact sensors designed specifically for detecting proximity or motion 430 may be used. For example, an infrared, microwave, or ultrasonic camera or sensor may be used to indicate whether a person has come within a range or sector such as within a predetermined range or sector of the display case. These devices may also be used to indicate a person's direction of travel such that a person approaching the display case can be distinguished from a person that is not approaching the display case.

Contact sensors designed specifically for detecting proximity or motion 434 may be used. For example, a pressure sensor, e.g., a pressure plate sensor such as a pressure actuated switch may be used to indicate whether a person is in a particular location relative to the display case. For example, a pressure sensor, e.g., a pressure actuated switch, may be used to indicate whether an item such as a displayed item available for removal and/or purchase remains in its original position.

Sensors that determine motion and/or position are not limited to the specialty sensors mentioned above. For example, audio from a microphone sensor 444 may be used to indicate a person's presence near a display case. For example, analysis and/or comparison of one or more video camera frames can be used to detect motion, position, direction of motion. Position may be detected when a person's position in a frame is analyzed. Motion and/or direction of motion may be detected when a person's change in position in multiple frames is analyzed. Suitable cameras include any of the video camera 438, HD video camera 440, and web camera 442.

Magnetic sensors such as magnetic switches 432 may be used to detect a position of one part relative to another such as the position of a display case door (e.g., 390) relative to a housing (e.g., 380). Temperature sensors such as a thermocouple, solid state temperature sensor, resistance temperature device (RTD), or thermistor may be used to monitor temperature such as a ventilation air temperature, a system box internal temperature, a display space temperature, or a refrigerated/freezer space temperature.

Turning again to use of cameras such as video camera 338 and HD video camera 440, images of a person near the display case may be used to assess personal characteristics to the extent allowed by law in the jurisdiction where the display case is operated. Images may be used to assess one or more of location, age, gender, race, ethnicity, demographic, behavior, emotion, mood, head turning and similar observation based characteristics of the person. In addition facial imaging may be used to determine either if the person matches a data file available for matching or if the person matches an available data file that enables identification of the person by name or other unique/quasi-unique indicia.

In some embodiments, a camera such as the video camera 438 or HD video camera 440 may be used to identify items the person holds or wears for the purpose of suggesting a complementary item available from the display case or another known location. For example, when a proximity sensor 430 identifies a nearby patron, a video camera image of the person may identify a bottle of wine held by the person and the local controller 412 may match the wine with a complementary cheese available from the display case that is subsequently displayed on the LCD panel. Such feedback based suggestions or suggestions for purchase may also be made for complementary apparel and/or accessories.

In FIG. 4C, input/output devices that may be used in connection with display case operations are shown. Imaging and/or video input devices include a video camera such as a HD video camera 454, a web camera 455, an infrared camera 463, a scanner 460, and a gesture video camera 458 such as a video camera interoperating with gesture software, e.g. Intel RealSense™ software. Video output devices include a transparent LCD panel for display of video 451 (see e.g. LCD panel 104) and a video projector 457 such as an LED video projector.

Audio input devices include a microphone 456. Audio output devices 461 include one or more of speaker(s), speaker array(s), horn(s), horn array(s), ultrasonic devices e.g., Audio Spotlight® by Holosonics, and other suitable devices known to skilled artisans. As will be recognized, speaker array(s), horn array(s), and ultrasonic devices may be used to provide directional or highly directional sound, for example sound directed to a particular person in a particular location.

Tactile input devices include a keyboard or keypad 453 and a touch sensitive transparent LCD panel for presenting and sensing touch sensitive selections (see e.g. LCD panel 104). Scanner input devices include QR, barcode, magnetic strip, and EMV credit card scanners.

In addition, various control input devices may be included in certain display cases. For example, a control interface presented via transparent LCD panel video 451 with selections via transparent LCD panel touch 452 may be used to manipulate an object within a display case. Control output devices such as environment control devices 459 may include any of a turntable for rotating an object within the display case, articulated/robotic manipulators for moving an object within the display case, and product dispensers, for example where dispensable products are on display. In some embodiments, points of sale devices (POS) 462 common in retail and vending industries are included.

Figure 4D:
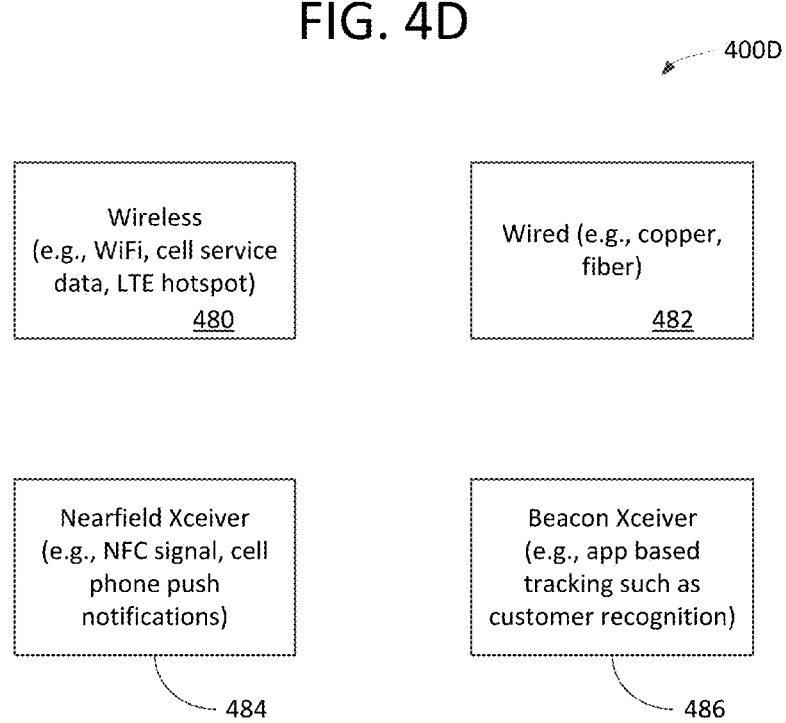

FIG. 4D shows various display case communications means 400D. In some embodiments, selected communications means are applicable to one or both of the LCU 416 and RCU 420. Wireless 480 communications include WiFi, cell service data, and LTE hotspot communications. Wired 482 communication media includes wiring such as copper wiring and free space or fiber guided optical communication such as fiber optic communications.

Other communications means may link the local controller 412 and/or the LCU 416 to patron held devices such as cell phones, beacons, radio ID tags, and the like. For example, a nearfield transceiver communications link 484 may be provided using an NFC signal and/or cell phone push notifications. For example a Beacon (i.e., cell phone app based or specialized active radio beacon adapted to tracking people) transceiver communications link 486 may be provided for customer tracking.

FIGS. 5A-G show selected display case operations 500A-G.

Figure 5A:
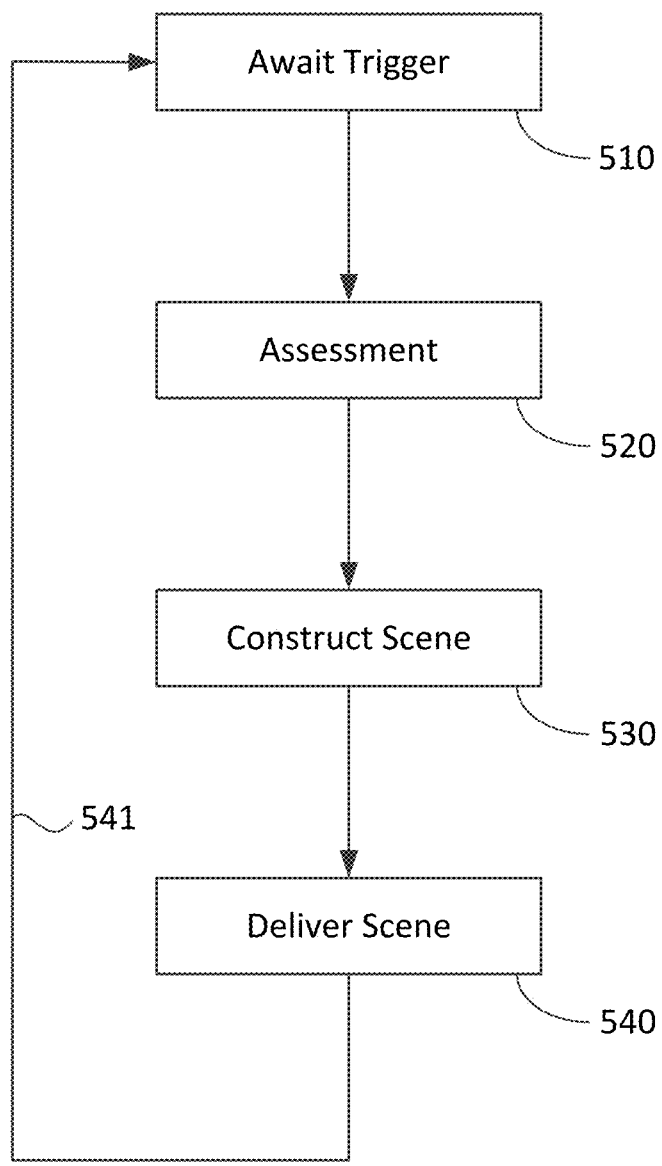

FIG. 5A illustrates a first multimedia immersion facility via a first flowchart 500A. Implemented at least in part in a controller such as the local controller 412, the flowchart describes a patron interaction process that runs when triggered by the patron's presence near the display case.

In a first await trigger step 510, the process awaits the presence of a patron as indicated by a sensor. When the sensor indicates the presence of a patron, an assessment step 520 follows.

Assessment of a patron in step 520 includes one or more of assessing a patron's gender, age, ethnicity, reaction, mood, head movement, facial features, clothing, accessories, and possessions. When the patron assessment step is completed, a construct scene step 530 follows.

Construction of a scene in step 530 includes one or more of selecting a video scene for display on the LCD panel 104, selecting a video scene for projection 457 on a surface other than a display case surface, selecting an audio recording for playback via the amplifier and speakers 461, and selecting a movement of an object within the display case via a manipulator 459. When the scene construction step is completed, a deliver scene step 540 follows.

Delivery of a scene in step 540 includes an orchestrated delivery of the LCD panel display, the projected display, the audio recording, and the object manipulation. When the scene delivery step is completed, the process may return 541 to the await trigger step 510.

Figure 5B:
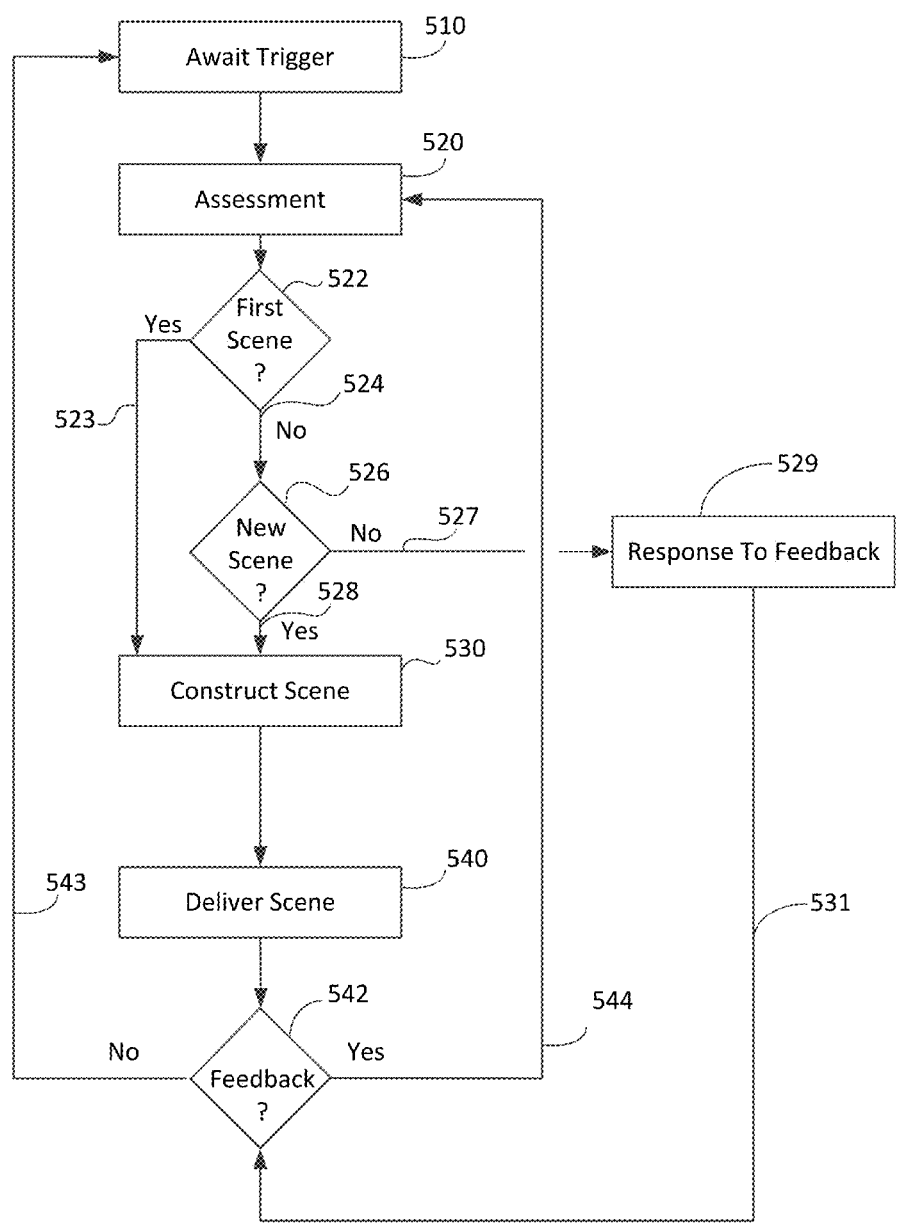

FIG. 5B illustrates a second patron multimedia immersion facility using a second flowchart 500B. Implemented at least in part in a controller such as the local controller 412, the flowchart describes a patron interaction with process that runs when triggered by the presence of a patron near the display case.

In a first await trigger step 510, the process awaits the presence of a patron as indicated by a sensor. When the sensor indicates the presence of a patron, an assessment step 520 follows.

Assessment of a patron in step 520 includes one or more of assessing a patron's gender, age, ethnicity, reaction, mood, head movement, facial features, clothing, accessories, and possessions. When the assessment step is completed, a first scene query step 522 follows.

In the first scene query step 522, a determination is made as to whether a first scene has yet to be constructed 530 and delivered 540. If Yes 523, the construct scene step 530 follows.

Construction of a scene in step 530 includes one or more of selecting a video scene for display on the transparent LCD panel 104, selecting a video scene for projection 457 on a surface other than a display case surface, selecting an audio recording for playback via the amplifier and speakers 461, and selecting a movement of an object within the display case via a manipulator 459. When the scene construction step is completed, a deliver scene step 540 follows.

Delivery of a scene in step 540 includes an orchestrated delivery of two or more of the LCD panel display, the projected display, the audio recording, and the object manipulation. When the scene delivery step is completed, a feedback query step 542 follows.

The feedback query step 542 awaits, for example for a predetermined time, patron action(s) such as responses to the delivered scene and/or questions. To the extent there is such a patron action, the process returns 544 to the assessment step 520 wherein the patron action is assessed to determine an appropriate response and/or appropriate content responsive to the patron action. To the extent no patron action is recognized as eliciting a response, the process returns 543 to the await trigger step 510.

Where assessment 520 follows feedback 542, the next step is the first scene query. The answer to the first scene query is No 524 where, as here, a first scene was earlier constructed 530 and delivered 540. When the first scene query is answered, a new scene query step 526 follows.

In the new scene query step 526, a determination is made as to whether or not a new scene should be used in a response to the patron action. If answered No 527, the response to feedback step 529 follows and a response, other than constructing and delivering a new scene, may be made. If answered Yes 528, the next step is the construct scene step 530. Notably, where a response to feedback 529 is made, the process may return 531 to the feedback query 542.

Construction of a scene in step 530 is executed here for a second or subsequent time. Here, the scene constructed is at least in part responsive to the patron action. Scene construction includes one or more of selecting a video scene for display on the LCD panel 104, selecting a video scene for projection 457 on a surface other than a display case surface, selecting an audio recording for playback via the amplifier and speakers 461, and selecting a movement of an object within the display case via a manipulator 459. When the scene construction step is completed, a deliver scene step 540 follows.

Delivery of a scene in step 540 includes an orchestrated delivery of two or more of the LCD panel display, the projected display, the audio recording, and the object manipulation. When the scene delivery step is completed, a feedback query step 542 follows.

The number of times that patron feedback is responded to may be limited. For example, responses may be limited as x responses per time span, y responses per patron, or z responses per product as in z responses per product per hour for example.

FIG. 5C shows a device application table 500C. The table includes sensor devices, processor devices, and multimedia devices. Sensors include a proximity sensor (e.g., 430), a door switch (e.g., 432), a pressure plate switch (e.g., 434), a web camera (e.g., 442), a video camera (e.g., 440), an infrared camera 443 and a microphone (e.g., 444). Sensors may be used for activities including trigger (e.g. 510), assessment (e.g., 520), construct scene (e.g., 530), deliver scene (e.g., 540), and respond to feedback (e.g., 529, 544). Processing devices include a local controller 412 and/or a remote controller 422. Multimedia devices include a transparent LCD panel (e.g., 451), a video projector (e.g., 457), an audio output device (e.g., 461) and an environment control device(s) (e.g., 459).

Trigger devices may include any one or more of a specialized proximity sensor, door switch, pressure plate, web camera, video camera, and microphone. As explained above, any of these devices might be used alone or in combination to detect, with or without use of a local or remote controller, the presence of a patron near a display case and/or in a particular location.

Assessment devices may include any one or more the web camera, video camera, and microphone. As explained above, any of these devices might be used alone or in combination to detect, for example with use of a local or remote controller, information about a patron that is observable (e.g. color of hair) or that might be gleaned from observations (e.g., estimated age).

Scene construction devices may include any one or more of the web camera, video camera, microphone, local controller and remote controller. As explained above, any of these devices might be used alone or in combination to create a scene that is personalized to a patron or not.

Scene delivery devices may include any two or more of the transparent LCD panel, video projector, audio output devices, and environment controls such as merchandise manipulators. As explained above, any of these devices might be used alone or in combination to interact with a patron. And, as explained above, combinations of these device may be used to immerse a patron in a specially created and/or personalized multimedia scene.

FIG. 5D shows an active interactions table 500D. Devices listed in the table may be used by a patron to interact with the display case or with display case scenes. Devices include a touch sensitive transparent LCD panel (e.g., 452), a keyboard or keypad (e.g., 453), an audio input device such as a microphone (e.g., 456), imaging devices such as a HD video camera (e.g. 454) and/or an infrared camera (e.g., 463), environmental controls (e.g., 459), point of sale devices (e.g., 464) and a local man machine interface (e.g. 414).

LCD panel touch interactions include selection and messaging. Selection includes any of selection from among objects, characters, symbols, graphics, pictures and the like displayed by the LCD panel video 451. For example, controls for manipulating and/or dispensing display case contents may be implemented using the LCD panel touch capabilities. Messaging includes any of messaging via use of a virtual keyboard, virtual keypad, or messaging via any of the mentioned selections.

Keyboard/keypad interactions include selection and messaging with a physical keyboard or keypad. Selection includes any of selection from among objects, characters, symbols, graphics, pictures and the like displayed on the keyboard/keypad. Messaging includes any of messaging via use of the keyboard/keypad.

Microphone interactions are voice interactions. These interactions may or may not involve voice recognition. For example, merely making a sound may provide the interaction. Or, voiced messages, instructions, commands, and/or requests may be converted into words for use by the local controller 411.

Video camera interactions include the use of gestures. For example, the local controller 411 may compare a patron's gestures observed by a video camera 454 with a library of gestures stored in a local controller memory to determine what message, instruction, command, and/or request the gesture(s) represents.

Environment control interactions include manipulation of a product within the display case. These controls may be exercised by any of the LCD panel touch, keyboard/keypad, microphone, video camera, and local man machine interface. As discussed above, environment controls may be associated with, among other things, a turntable to turn an item within the display case, an articulated manipulator to move a product within the display case, and a actuator to dispense product from a product container within the display case.

Point of sale interactions include payment transactions available using known point of sale devices for making a payment. For example, credit card payments whether via magnetic reader or chip reader for EMV capable cards. For example, digital wallet payments such as Apple Pay payments via cell phone app. For example Pay Pal payments via LCD panel touch and local controller 411.

Local man machine interface (MMI) interactions include any one or more of the interactions mentioned above.

FIG. 5E shows a passive interactions table 500E. Devices listed in the table may be used without human intervention. Devices include a video camera such as an HD video camera (e.g., 454) and/or an infrared camera (e.g., 463), a proximity or motion sensor (e.g., 430), a contact or pressure plate sensor (e.g., 434), and a door sensor such as a magnetic switch (e.g., 432).

Video camera passive interactions include facial recognition, demeanor recognition, proximity sensing, and position sensing. Facial recognition and demeanor recognition may be carried out in any of the local controller 411, remote controller 422 or web accessible server computer.

Proximity or motion sensor passive interactions include proximity sensing, position sensing, and direction of travel sensing. To the extent sensing requires multiple sensor readings, the local controller 411 may carry out required tabulations and/or comparisons.

Door switch passive interactions including indicating one or more door positions. For example, a door switch located on a door jamb may be used to signal shutting down the LCD lights within a display case when the door is opened.

The schematic of FIG. 5F shows a display case such as a display case operating in a patron attraction mode 500F. Display case 590 operation in the patron attraction mode may occur when display case sensors indicate no patron is nearby. As shown, display case components include a housing 562, a case front 564, a movable door 566 mounted in the case front, and a transparent LCD panel 568 mounted in the movable door.

For sensing proximity or motion of a patron, either of a video camera 572 or a proximity sensor 574 may be used. For presenting a scene, any of the transparent LCD panel 568, a video projector 570, and audio transducers 576 such as directional sound transducers may be used.

While operating in the attraction mode, the display case 590 may deliver a scene constructed from stock video and audio stored in a local controller 412 memory 411. Or, the scene may include image(s) of a patron known to be not nearby (e.g., within 3 meters), but in the area (e.g., within 50 meters).

Figure 5G:
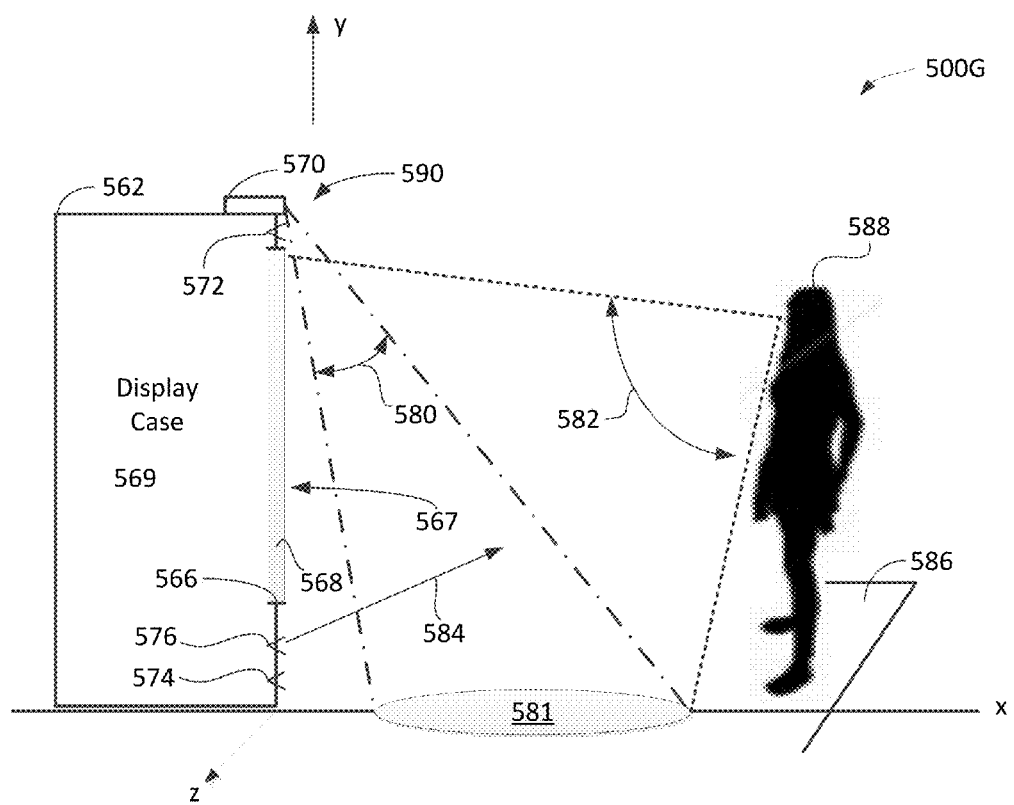

The schematic of FIG. 5G shows a display case operating in an interaction mode 500G. The display case 590 is in the interaction mode because display case sensors indicate a patron 588 is nearby. As seen, the patron is located in an interaction zone 586 such that a display case scene can be delivered to immerse the patron in a multimedia experience. The multiple media include video content 567 displayed on the transparent LCD panel 568 and product(s) 569 within the display case viewable through the transparent LCD panel. The multiple media may include video content 580 displayed on a surface adjacent to the patron 588 via a video projector 570, for example video content displayed on the floor 581 between the patron and the display case. The multiple media may include audio content 584 emitted from an audio transducer 576 that directs sound to preferentially ensonify a zone or field immediately around the patron.

Scene video content may include one or more of stock video, live video such as live video available via the Intenet, and live or recorded video of the patron 588 as observed by the video camera 572. For example, a scene may mix product video with lifestyle video selected based on patron assessment. For example, a scene may place a patron in a virtualized context such as wearing a displayed product.

In an embodiment, video of the patron captured by a premises video camera such as the case video camera 572 is used to construct content for a scene showing the patron using/enjoying a product 569 displayed within the case 590. In various embodiments, patron assessment is used to select video content that is appropriate for any of the age, sex, ethnic group, or known shopping pattern of the patron. And, in various embodiments, patron assessment is used to suggest products that are appropriate for any of the age, sex, ethnic group, or known shopping pattern of the patron.

Scene video may be coordinated such that from the patron's view 582, the transparent LCD panel video image 567 and the projector video image 581 merge to create an actual multidimensional video display that immerses the patron. For example, transparent LCD panel video 576 displayed in the y-z plane may be coordinated with projector video 580 displayed in a x-z plane.

Figure 6A:
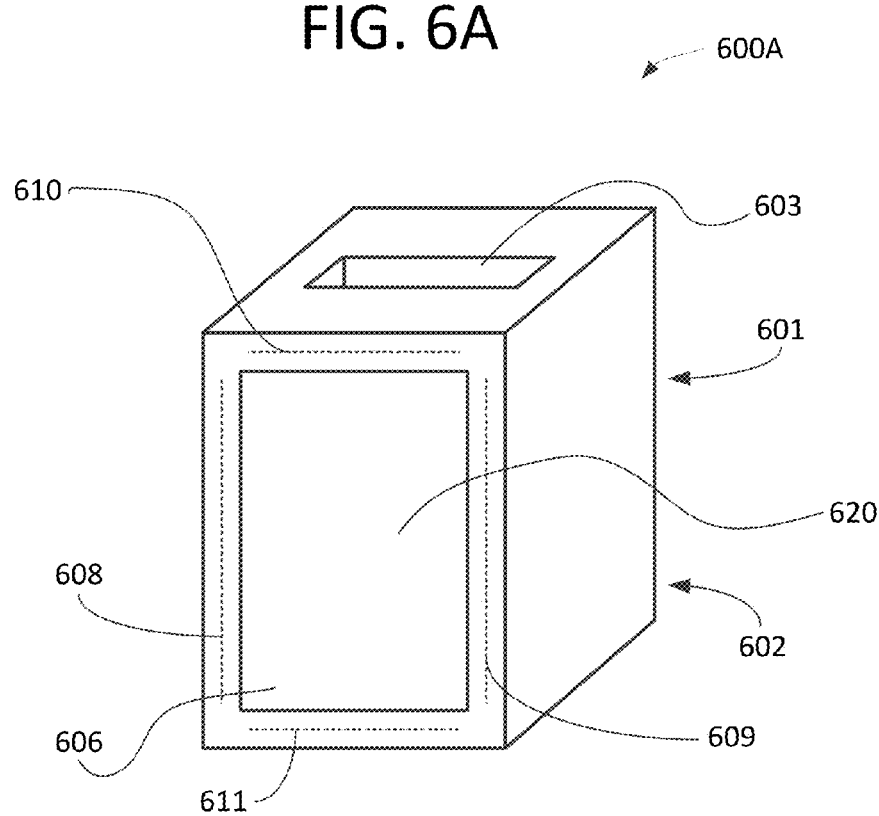
FIGS. 6A-B show a display case in the form of a donation kiosk.

FIG. 6A shows a display case adapted for use as a donation kiosk 600A. The kiosk provides for receiving donations and for viewing received donations through a transparent LCD panel. In various embodiments of the kiosk 600A, any suitable display case features mentioned above may be employed in connection with making and/or using the donation kiosk. Selected embodiments are described below.

As shown, a kiosk housing 602 is arranged around a donation display space 620 that receives donations via a housing opening such as a housing opening such as a housing top opening 603. A transparent LCD panel 606 and the donation display space 620 are arranged to provide a view through the panel into the donation display space. Not shown is an optional door in a sidewall of the housing for accessing the interior of the housing 602.

Backlighting for the transparent LCD panel 606 is provided by lights within the housing 602. These lights may include one or more of vertical LED lighting arrays 608, 609 along each of the vertical panel edges and horizontal LED lighting arrays 610, 611 along each of the horizontal panel edges.

Figure 6B:
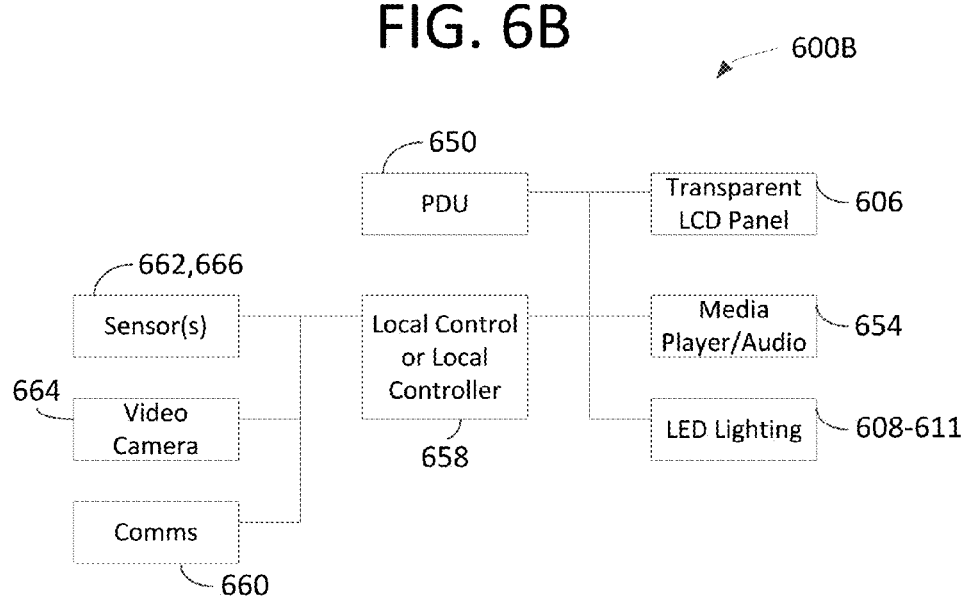

FIG. 6B shows an electrical device schematic 600B. The kiosk may house one or more of the electrical devices shown. A power distribution unit ("PDU") 650 is for selectively distributing electric power to one or more of the LED lighting arrays 608-611 and a media player 654 for supplying video content to the transparent LCD panel 606. Some embodiments include a local controller 658 for carrying out any of the functions mentioned in connection with local controllers 412 above.

Where a local controller 658 is provided, communications such as wireless or Internet communications 660 may be implemented. Where triggering of scenes and/or patron interactions are provided, any of a proximity sensor 662, video camera 664, or donation sensor such as a housing opening photocell 666 may be used to sense a triggering event such as a patron's presence and/or a donation being made.

The kiosk 601 may utilize a transparent LCD panel that is touch sensitive for one or more of charity selection, payment, and collection of donor information used to report donor activity via a social media website. Yet other means of making financial donations include any of the payment means mentioned in connection with the display cases above.

A patron's donation may be recognized in various ways. For example, a scene such as an audiovisual scene may be triggered by a donation. For example, patron information and/or images may be acquired via the LCD panel touch screen 606 and/or a video camera 664 and the information may be used to construct content to be posted to a charity, social media, or another web site of the patron's choosing.

The present invention has been disclosed in the form of exemplary embodiments. However, it should not be limited to these embodiments. Rather, the present invention should be limited only by the claims which follow where the terms of the claims are given the meaning a person of ordinary skill in the art would find them to have.

What is claimed is:

1. A display case system for viewing a product through a transparent liquid crystal display (LCD) screen, the display case comprising:
a housing arranged around a product display space;
the screen outside a housing opening to provide a view into the product display space;
a plurality of light emitting diode (LED) arrays within the product display space for backlighting the screen;
a power supply responsive to control signals for selectively distributing electric power to one or more of the arrays;
a local controller for electrically exchanging signals with the power supply and a sensor;
the sensor for triggering operation of the screen when a patron whose direction of motion brings them closer to the display case is recognized by the sensor;
a multimedia patron immersion function;
tasks implementing the function include patron assessment, scene creation, scene delivery, and a response to patron feedback;
patron assessment via voice recognition;
scene creation that results in video and audio content that is personalized based on patron assessment;
delivery of the personalized scene directed to a space occupied by the patron; and,
patron reaction to the personalized scene followed by a display case system multimedia message responding to the patron and directed to a space occupied by the patron.

2. The display case system of claim 1 wherein:
patron assessment includes an assessment of patron gender, age, and ethnicity assessments;
scene creation utilizes content derived from video camera images of the patron;
scene delivery includes video presented in a first plane via the LCD screen and video presented in a second plane different from the first that intersects the first plane;
scene delivery includes audio presented via a sound field focused on the patron;
patron feedback is via patron hand gestures received by the video camera and interpreted by the local controller; and,
delivery of a response to the feedback includes physical manipulation of a product within the display case.

3. The display case system of claim 2 wherein:
patron assessment further includes an assessment of patron reaction, mood, and head tracking via one or more patron images.

4. The display case system of claim 2 wherein:
the video presented in the second plane is video projected on the floor adjacent to the patron.

5. The display case of claim 2 wherein a manipulator is configured to manipulate a product dispenser in the display case and to dispense a product dispenser product for use by the patron.

6. A display case system including a housing and a transparent window immovable with respect to the housing for viewing a product therethrough, the display case comprising:
- a window LCD screen formed from a transparent LCD cell mounted to and covered by a carrier glass;
- a viewable surface of the LCD screen opposite a window front-most glass with nothing therebetween;
- the product opposite the LCD screen with nothing therebetween;
- a plurality of light emitting diode (LED) arrays within a product display space for backlighting the LCD screen;
- a power supply responsive to control signals for selectively distributing electric power to the arrays;
- a local controller for electrically exchanging signals with the power supply and a sensor;
- the sensor for sensing the presence of a patron for triggering operation of the screen;
- wherein multiple sensed patron positions determine whether the patron is approaching the display case and screen operation requires that the patron be approaching the display case;
- a multimedia facility for immersing a patron in a multimedia presentation when the display case system recognizes the patron is positioned in an interaction zone; and,
- the multimedia facility for delivering a scene including video presented in a first plane via the LCD screen and projected video presented in a second plane different from the first that intersects the first plane.

7. The display case system of claim 6 wherein the projected video is video projected on a floor on which the patron stands.

8. The display case system of claim 7 wherein scene delivery includes audio presented via an audio transducer that preferentially directs sound to ensonify a field immediately around the patron.

9. The display case system of claim 7 wherein a premises video camera captures video of the patron that is made a part of scene content.

* * * * *